(12) United States Patent
Chung (10) Patent No.: US 7,625,980 B2
(45) Date of Patent: Dec. 1, 2009

(54) METHOD FOR IMPROVING EXTRUSION SURFACE SMOOTHNESS IN THERMOPLASTIC VULCANIZATES

(75) Inventor: Oansuk Chung, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 440 days.

(21) Appl. No.: 11/484,156

(22) Filed: Jul. 11, 2006

(65) Prior Publication Data

US 2008/0015313 A1     Jan. 17, 2008

(51) Int. Cl.
*C08L 23/04* (2006.01)
*C08L 23/10* (2006.01)
*C08L 9/00* (2006.01)
*C08L 45/00* (2006.01)

(52) U.S. Cl. .................. 525/191; 525/211; 525/232; 525/240

(58) Field of Classification Search ............... 525/191, 525/211, 232, 240
See application file for complete search history.

(56) References Cited

U.S. PATENT DOCUMENTS

| | | | |
|---|---|---|---|
| 5,552,482 A | 9/1996 | Berta | |
| 6,022,946 A * | 2/2000 | McCullough, Jr. | 528/480 |
| 6,288,171 B2 | 9/2001 | Finerman et al. | |
| 6,451,915 B1 | 9/2002 | Ellul et al. | |
| 6,610,786 B1 | 8/2003 | Itoh et al. | |
| 6,630,538 B1 | 10/2003 | Ellul et al. | |
| 2003/0144415 A1 | 7/2003 | Wang et al. | |
| 2004/0132907 A1 | 7/2004 | Nakamura et al. | |
| 2004/0236032 A1 | 11/2004 | Bacci et al. | |
| 2005/0043484 A1 | 2/2005 | Wang et al. | |
| 2005/0256273 A1 | 11/2005 | Imai | |
| 2006/0293454 A1 * | 12/2006 | Nadella et al. | 525/191 |

FOREIGN PATENT DOCUMENTS

| | | |
|---|---|---|
| EP | 1 550 693 | 7/2005 |
| EP | 1 401 925 | 10/2005 |
| WO | WO 03/082971 A2 | 10/2003 |
| WO | WO 2005/028555 A1 | 3/2005 |

OTHER PUBLICATIONS

Terry M. Finerman, Luc Vandendriessche, Joseph E. Pfeiffer, Kelly Kirkendall, "Compounding of Rubber Concentrate Thermoplastic Vulcanizates", Society of Plastic Engineers Topical Conference TPE's 2000, Sep. 28-29, 1999.

Yungong Wang and Ryszard Brzoskowski,"New EPDM Rubber Concentrates for Making Thermoplastic Vulcanizates (TPVs) by Toll Compounding Process", SPE ANTEC Proceedings, 3041 (2003).

Yudong Wang and Ryszard Brzoskowski,"New Soft EPDM Rubber Concentrate for Toll Compounding to Produce High Flow Thermoplastic Vulcanizates (TPVs) for Injection Molding Applications", SPE ANTEC Proceedings, 4187 (2004).

* cited by examiner

*Primary Examiner*—Nathan M Nutter (57) ABSTRACT

Thermoplastic vulcanizates having improved physical properties, including extrusion surface roughness can be achieved by a method that includes a first processing step to form a fully cured TPV base, a cooling step wherein the fully cured TPV base is solidified and a second processing step which imparts improved physical properties including improved extrusion surface roughness to the resultant TPV. The method may be adapted for use in conjunction with a peroxide curing agents to protect a portion of the thermoplastic, which may be polypropylene, from degradation by the peroxide curing agent. The adaptation to the methods may include the addition of a portion of the thermoplastic to the TPV after the peroxide curing agent has been added. The adaptation may also include one or more devolatalization steps with or without the addition of a stripping agent.

28 Claims, 1 Drawing Sheet

Figure 1

METHOD FOR IMPROVING EXTRUSION SURFACE SMOOTHNESS IN THERMOPLASTIC VULCANIZATES

I. BACKGROUND OF THE INVENTION

1. Field of Invention

The present invention relates to thermoplastic vulcanizates and methods of forming thermoplastic vulcanizate to improve processability and extrusion properties.

2. Description of the Related Art

Thermoplastic vulcanizates ("TPV") consist of an amount of finely dispersed crosslinked rubber particles in a continuous thermoplastic. Dynamic vulcanization is the process of selectively crosslinking rubber during its melt mixing with a molten thermoplastic and the best method to produce TPVs. TPVs have the benefit of the elastomeric properties provided by the rubber phase, with the processability of thermoplastics.

The rubber phase can be comprised of more than one rubber component so long as they are vulcanizable as well. Additional uncrosslinked thermoplastics, including uncrosslinked elastomers, can as well be included in the continuous thermoplastic phase, and can in some instances additionally be partially incorporated in the crosslinked rubber phase, thus creating interfacial adhesion and increased compatibility between the continuous and discontinuous phases. Process oils, in addition to any extender oils in the rubber, or other polymeric components, are optionally introduced to improve processing at various locations in the processing equipment. Traditional fillers, reinforcing fibers, additives, colorants, and the like, can be added before or after extrusion of the TPV compositions from the melt processing extruder. Typically, the TPV compositions described can be pelletized by methods commonly used in the thermoplastics processing art. The TPV pellets so prepared can be further melt processed with other conventional components or additives in compounding, for thermoplastic molding or shaping into final products.

The environment in which thermoplastic vulcanizates are formed and in which vulcanization of the rubber constituent occurs is typically defined by significant shearing forces, heat, and the presence of a variety of additives, including rubber curing agents and co-agents that facilitate cross-linking of the rubber. The processing conditions and selection of materials in the TPV composition can materially impact the quality of the TPV on extrusion. It is desirable to provide TPVs that exhibit good physical properties and processability, while maintaining excellent extrusion properties. However, balancing these desirable characteristics has proven difficult. Extrusion surface smoothness (which may also refer to as extrusion surface roughness (ESR)) is a particularly important extrusion property as the ESR may dictate the suitability and aesthetics of a final extruded product. Thus, it is desirable when formulating and processing TPVs to maintain or improve ESR in combination with efforts to improve physical properties and processability.

Exemplary of the impact that processing conditions, for example, can have on the physical and extrusion properties of thermoplastic vulcanizates, it is known that peroxide curing agents can degrade polyolefin thermoplastics, most notably polypropylene, in such a way as to adversely affect the physical properties of the resultant thermoplastic vulcanizate. The degradation of polypropylene in peroxide cured TPVs has created technical challenges that have given rise to new approaches of forming peroxide cured polypropylene based TPVs so as to protect the polypropylene from degradation in order to improve physical and extrusion properties.

U.S. Pat. No. 6,610,786 and US 2005/256273 describe a process for making a TPV that involves adding a portion of the thermoplastic and selected other additives to the composition after the peroxide curing agent has been added to the extrusion chamber and the rubber has been substantially cured. The Mitsui approach has the benefit of protecting a portion of the thermoplastic from degradation by the peroxide curing agent; however, on extrusion of the material from the extrusion chamber, the TPV has less than desirable extrusion surface smoothness.

Another approach described in US 2004/236032 involves a process of making a master batch by melt blending the elastomer with the thermoplastic polyolefin, curing co-agents and selected additives. The master batch, which is uncured, is solidified and then melt mixed with a curing agent and optionally other additives. Thus, Basell produces an uncured master batch containing the full amounts of elastomer and thermoplastic polyolefin. Curing takes place in a second processing step. However, the thermoplastic polyolefin (i.e., polypropylene) is subjected to exposure by the curing agent in the second processing step, thereby adversely affecting physical properties.

It would be desirable to provide a method of forming thermoplastic vulcanizates to balance physical properties and processability, while maintaining excellent extrusion properties, including extrusion surface smoothness.

II. SUMMARY OF THE INVENTION

The present invention is directed to methods for improving physical characteristics of thermoplastic vulcanizates, including extrusion surface smoothness. The method includes a first processing step to produce a fully cured TPV base, a cooling step wherein the TPV base is pelletized and solidified, and a second processing step.

According to another aspect of the invention, the first and second processing steps may take place in respective multi-screw extruders.

According to another aspect of the invention, the first processing step may include a devolatalization step. The devolatalization step may include removing volatiles from the mixing chamber by means of a vacuum. The devolatalization step may further include adding an amount of a stripping agent to enhance removal of volatiles from the thermoplastic vulcanizate.

According to another aspect of the invention, both the first and second processing steps may include a devolatalization step.

According to yet another aspect of the invention, the first processing step may produce a complete thermoplastic vulcanizate, wherein by "complete" it is meant that the thermoplastic vulcanizate has the full measure of thermoplastic and rubber. According to this embodiment, the complete thermoplastic vulcanizate may be achieved by the addition of the full measure of thermoplastic and rubber at the beginning of the first processing step. According to another embodiment, the complete thermoplastic vulcanizate may be achieved by addition of all or a portion of the thermoplastic following the addition of the peroxide curing agent during the first processing step.

According to yet another embodiment of the invention, the first processing step may result in an incomplete thermoplastic vulcanizate which may be referred to as a rubber concentrate TPV base. In this embodiment the full amount of the thermoplastic may not be added to the TPV in the first processing step, but a portion of the thermoplastic may be added in the second processing step.

According to another aspect of the invention, fully cured complete TPVs having a hardness of between 40 Shore A and 80 Shore A may be extruded following the second processing step.

In accordance with another aspect of the invention, the portion of thermoplastic added at the beginning of the second processing step may be solid thermoplastic.

Other aspects and embodiments of the methods of the subject invention may be described herein.

II. DESCRIPTION OF THE PREFERRED EMBODIMENT

According to one embodiment of the present invention, a multi-step method of forming a thermoplastic vulcanizate is disclosed, wherein the steps of the method are selected to produce a thermoplastic vulcanizate having improved processability, including extrusion properties, namely extrusion surface smoothness (which may also be referred to as extrusion surface roughness or ESR) as compared to conventionally prepared thermoplastic vulcanizates.

The method comprises at least first and second processing or mixing steps separated by a cooling step in which the TPV base formed in the first processing step is pelletized and solidified. More specifically, the method comprises a first processing step in which a selected amount of rubber and thermoplastic is blended in the presence of a curing agent to form a TPV base having at least partially, and preferably fully cured rubber, a cooling step wherein the TPV base is pelletized and solidified, and a second processing step, which may be a reprocessing step of the pelletized TPV base with or without additional amounts of thermoplastics or other additives, to form a TPV having improved process characteristics, including improved extrusion properties. As demonstrated herein, the ESR of thermoplastic vulcanizates produced according to this multi-step process, embodiments of which are further elucidated below, is improved as compared to TPVs formed using other conventional preparation methods.

Having generally described the steps of the preferred method, each of the steps will be further described according to selected embodiments.

The first processing step of the method may involve combining selected amounts of one or more rubbers, one or more thermoplastics, and one or more additives, including one or more curing agents, in a first chamber.

The first chamber may be any vessel that is suitable for blending the selected amounts of rubber, thermoplastic, and additives under temperature and shearing force conditions necessary to form a thermoplastic vulcanizate base. In this respect, the first chamber may be a mixer, such as a Banbury™ mixer, or a mill, or an extruder. According to one embodiment, the first chamber is an extruder, which may be a single or multi-screw extruder. The term "multi screw extruder" means an extruder having two or more screws; and two or twin-screw extruders being preferred for the first processing step. The screw elements of the extruder may have a plurality of lobes; two and three lobe screw elements being preferred and three lobe screw elements being most preferred for the first processing step, though it will be understood that other screw designs may be selected in accordance with the methods of the present invention.

With continued reference to the first processing step, it is expressly contemplated that the first processing step is undertaken to achieve formation of a thermoplastic vulcanizate base, comprising selected amounts of one or more rubber, one or more thermoplastics, and one or more additives. To this end, a first amount of the rubber, which may be a single rubber or a blend of two or more rubbers, may be added to the first chamber. A first amount of a thermoplastic, which may be a single thermoplastic or a blend of two or more thermoplastics may also be added to the chamber. Optionally, amounts of one or more common additives may also be added to the first chamber. One of the additives is preferably a curing agent selected for curing the rubber. Suitable rubbers, thermoplastics and additives will now be described.

Rubbers (also referred to as "elastomers") suitable for use in the methods and compositions of the invention should be at least partially compatible with the selected thermoplastics and have reactive cure sites. Thus thermoplastics will typically be used with cross-linkable, non-polar olefinic rubbers. The thermoplastics, are combined typically with cross-linkable polar rubbers, or combined polar and non-polar rubbers, often with appropriate compatibilizers. The cure sites can either be an integral part of the elastomer backbone or can be incorporated by additional functional groups. As used herein, reference to an elastomer includes a mixture of two or more elastomers.

Unsaturated non-polar rubbers useful to prepare thermoplastic elastomers according to the invention include monoolefin copolymer rubbers comprising non-polar, rubbery copolymers of two or more monoolefins (EPR rubber), preferably copolymerized with at least one polyene, usually a diene (EPDM rubber). Collectively, EPR and EPDM may be referred to as ethylene/propylene rubber. EPDM is a polymer of ethylene, propylene and one or more non-conjugated diene(s), and the monomer components may be polymerized using Ziegler-Natta, metallocene, or other organometallic compound catalyzed reactions. Satisfactory non-conjugated dienes include 5-ethylidene-2-norbornene (referred to as ENB or EP(ENB)DM); 1,4-hexadiene (HD); 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; dicyclopentadiene (DCPD); 5-vinyl-2-norbornene (referred to as VNB or EP(VNB)DM); divinyl benzene, and the like, or combinations thereof. Such elastomers have the ability to produce thermoplastic vulcanizates with a cure state generally in excess of about 95 percent while maintaining physical properties attributable to the crystalline or semi-crystalline polymer.

The preferred diene monomers are 5-ethylidene-2-norbornene and 5-vinyl-2-norbornene. In the event that the copolymer is prepared from ethylene, alpha-olefin, and diene monomers, the copolymer may be referred to as a terpolymer or even a tetrapolymer in the event that multiple olefins or dienes are used.

The elastomeric copolymers contain from about 20 to about 90 mole percent ethylene units derived from ethylene monomer. Preferably, these copolymers contain from about 40 to about 85 mole percent, and even more preferably from about 50 to about 80 mole percent ethylene units. Furthermore, where the copolymers contain diene units, the diene units can be present in an amount from about 0.1 to about 5 mole percent, preferably from about 0.1 to about 4 mole percent, and even more preferably from about 0.15 to about 2.5 mole percent. The balance of the copolymer will generally be made up of units derived from alpha-olefin monomers. Accordingly, the copolymer may contain from about 10 to about 80 mole percent, preferably from about 15 to about 50 mole percent, and more preferably from about 20 to about 40 mole percent alpha-olefin units derived from alpha-olefin monomers. The foregoing mole percentages are based upon the total moles of the polymer.

Butyl rubbers are also useful in the thermoplastic elastomer compositions. As used in the specification and claims, the term butyl rubber includes copolymers of an isoolefin and a conjugated diolefin, terpolymers of an isoolefin with or without a conjugated diolefin, divinyl aromatic monomers and the halogenated derivatives of such copolymers and terpolymers. The halogenated versions thereof are particularly useful, especially brominated butyl rubber. Another suitable copolymer within the scope of the olefin rubber of the present invention is a copolymer of a $C_{4-7}$ isomonoolefin and a para-alkylstyrene, and preferably a halogenated derivative thereof. The amount of halogen in the copolymer, predominantly in the para-alkylstyrene, is from 0.1 to 10 weight percent.

Suitable elastomeric copolymers for use with polyolefin thermoplastics, includes the cyclic olefin copolymer rubbers known in the art. Such are particularly suitable with the high melting point cyclic olefin copolymer engineering resins.

The elastomeric copolymers preferably have a weight average molecular weight that is greater than about 200,000 atomic mass units (amu), more preferably from about 300,000 to greater than about 1,000,000 amu, even more preferably from about 400,000 to greater than about 700,000 amu. These copolymers preferably have a number average molecular weight that is greater than about 70,000, more preferably from about 100,000 to about 350,000 amu, even more preferably from about 120,000 to about 300,000 a.m.u., and still more preferably from about 130,000 to about 250,000 amu. Elastomers, especially those in the high end of the molecular weight range, are often oil extended in the manufacturing process and can be directly processed as such in accordance with the invention process.

Useful elastomeric copolymers preferably have a Mooney Viscosity ($M_L$(1+4@125° C.)) of from about 20 to about 450, more preferably from about 50 to about 400, and even more preferably from about 80 to about 350, where the Mooney Viscosity is that of the non-oil extended elastomer or is that before adding oil to an oil-extended elastomer.

The vulcanizable elastomer can also be natural rubbers or synthetic homo- or copolymers of at least one conjugated diene with an aromatic monomer, such as styrene, or a polar monomer such as acrylonitrile or alkyl-substituted acrylonitrile monomer(s) having from 3 to 8 carbon atoms. Those rubbers are higher in unsaturation than EPDM rubber or butyl rubber. Those rubbers can optionally be partially hydrogenated to increase thermal and oxidative stability. Desirably those rubbers have at least 50 weight percent repeat units from at least one conjugated diene monomer having from 4 to 8 carbon atoms. Other comonomers desirably include repeat units from monomers having unsaturated carboxylic acids, unsaturated dicarboxylic acids, unsaturated anhydrides of dicarboxylic acids, and include divinylbenzene, alkylacrylates and other monomers having from 3 to 20 carbon atoms.

The synthetic rubber can be nonpolar or polar depending on the comonomers. Examples of synthetic rubbers include synthetic polyisoprene, polybutadiene rubber, styrene-butadiene rubber (SBR), butadiene-acrylonitrile rubber, etc. Amine-functionalized, carboxy-functionalized or epoxy-functionalized synthetic rubbers may be used, and examples of these include maleated EPDM, and epoxy-functionalized natural rubbers. These materials are commercially available.

Non-polar rubbers are preferred; polar rubbers may be used but may require the use of one or more compatibilizers, as is well known to those skilled in the art.

Suitable elastomers for use in accordance with the present invention may also include hydrogenated styrenic triblock copolymer elastomers, exemplified by SEBS (styrene/ethylene-butylene/styrene), SEPS (styrene/ethylene-propylene/styrene), SEEPS (styrene/ethylene-ethylene-propylene/styrene), which are widely commercially available and are described in further detail in U.S. Patent Application Pub. No. US 2004/0132907. As noted in the aforementioned reference, hydrogenated styrenic triblock copolymers may include crosslinkable styrenic blocks, which, in combination with the crosslinkable midblocks, may afford greater overall crosslinking of the cured elastomer within the TPV. These elastomers may have a styrene content as low as about 10% by weight to as high as about 50% by weight, preferably about 20% and about 40% by weight, and most preferably from about 25% to about 35% by weight. The molecular weight of the styrene component may be from about 7,000 to about 50,000 amu and the molecular weight of the elastomeric component may be from about 30,000 to greater than 150,000 amu. Methods of forming suitable hydrogenated styrenic triblock copolymer elastomers are well known in the art. See, G. Holden and N. R. Legge, *Styrenic Thermoplastic Elastomers*, in THERMOPLASTIC ELASTOMERS, Ch. 3. (G. Holden, N. R. Legge, R. Quirk, and H. E. Schroeder eds., Hauser/Gardner Publications, Inc., Cincinnati, Ohio, 1996).

Though the thermoplastic vulcanizate base and resulting TPV may be formed with any of the above referenced elastomers, and it is not the intention to restrict the types of suitable elastomers except as otherwise expressly provided herein, EPDM rubber, including, VNB and ENB are the exemplary elastomers in the examples below.

Suitable thermoplastics used in the invention may include crystalline or a semi-crystalline thermoplastics, and of such, more preferably is a thermoplastic that has a crystallinity of at least 10 percent as measured by differential scanning calorimetry. Polymers with a high glass transition temperature, e.g., non-crystalline glassy engineering thermoplastics, are also acceptable as the thermoplastic. Suitable thermoplastics generally are those with a melt temperature lower than the decomposition temperature of the rubber. Thus both polar and non-polar thermoplastics can be utilized in the current invention. See the descriptions in the above listed patents. As noted therein, often thermoplastic polyolefins are preferred in view of availability and suitability with polyolefin based rubbers, both being economic, high performing, and environmentally non-hazardous. As used herein, reference to a thermoplastic or thermoplastic includes a mixture of two or more different thermoplastics or a blend of one or more compatibilizers and two or more thermoplastics.

Exemplary thermoplastics include crystallizable polyolefins (such as homopolymers and copolymers of ethylene or propylene, and copolymers with cyclic olefins), polyimides, polyamides(nylons), polyesters, thermoplastic copolyesters or copolyamides, poly(phenylene ether), polycarbonates, styrene-acrylonitrile copolymers, polyethylene terephthalate, polybutylene terephthalate, polystyrene, polystyrene derivatives, polyphenylene oxide, polyoxymethylene, polymethymethacrylates, fluorine-containing thermoplastics and polyurethanes. The preferred thermoplastic resins are crystallizable polyolefins that are formed by polymerizing alpha-olefins such as ethylene, propylene, 1-butene, 1-hexene, 1-octene, 2-methyl-1-propene, 3-methyl-1-pentene, 4-methyl-1-pentene, 5-methyl-1-hexene, and mixtures thereof.

For example, known ethylene-based homo- and copolymers having ethylene crystallinity are suitable. Commercial products include high density polyethylene (HDPE), linear low density polyethylene (LLDPE), and very low density polyethylene (VLDPE, or plastomers). Propylene-based homopolymers and copolymers, such as isotactic polypropylene and crystallizable copolymers of propylene and ethylene or other $C_4$-$C_{10}$ alpha-olefins, or diolefins, having isotactic propylene crystallinity, are preferred. Copolymers of ethylene and propylene or ethylene or propylene with another alpha-olefin such as 1-butene, 1-hexene, 1-octene, 2-methyl-1-propene, 3-methyl-1-pentene, 4-methyl-1-pentene, 5-methyl-1-hexene or mixtures thereof are also suitable. These will include reactor polypropylene copolymers and impact polypropylene copolymers, whether block, random or of mixed polymer synthesis. These homopolymers and copolymers may be synthesized by using any polymerization technique known in the art such as, but not limited to, the "Phillips catalyzed reactions," conventional Ziegler-Natta type polymerizations, and organometallic, single-site olefin polymerization catalysis exemplified by, but not limited to, metallocene-alumoxane and metallocene-ionic activator catalysis.

Preferred polyolefin thermoplastics preferably have a weight average molecular weight ($M_w$) from about 50,000 to about 600,000 amu, and a number average molecular weight ($M_n$) from about 50,000 to about 200,000 amu. More preferably, these resins have a $M_w$ from about 150,000 to about 500,000 amu, and an $M_n$ from about 65,000 to about 150,000 amu. The molecular weight can typically be determined by gel permeation chromatography (GPC) using a suitable standard for the thermoplastic being measured. Additionally, $M_n$ and polymer structure can be measured using Differential Refractive Index (DRI) detectors and $M_w$ can be measured using Low Angle Light Scattering (LALLS). ASTM D 6474 provides a general description for polyolefins, see also ISO 11344 and T. Sun, 34 MACROMOLECULES, 6812 (2001) for adaptation for synthetic rubber.

Additionally, cyclic olefin copolymers can be used as high melting point polyolefin thermoplastics. Preferred cyclic olefins include cyclobutene, cyclopentene, cyclooctene, norbornene, 5-methyl-norbornene, 3-methyl-norbornene, ethyl-norbornene, phenyl-norbornene, dimethyl-norbornene, diethyl-norbornene, dicyclopentadiene, tetracyclododecene, methyltetracyclododecene, and the like. Lower carbon number alpha-olefins, e.g., $C_3$-$C_8$, can be used as comonomers, for disruption of crystallinity and reduction of melting point. Ethylene is a particularly preferred comonomer in the cyclic olefin copolymers.

The crystalline or semi-crystalline thermoplastics generally have a melt temperature (Tm) that is from about 40 to about 350° C., preferably from about 60 to about 210° C., more preferably from about 90 to about 180° C., and even more preferably from about 120 to about 170° C. The glass transition temperature (Tg) of these thermoplastics is from about −25 to about 100° C., preferably from about −5 to about 5° C. More generally speaking, including the semi-crystalline and glassy polar thermoplastics, useful thermoplastics will have a Tg of up to and greater than 100° C., and even greater than 150° C. The characterizing temperatures are can be determined by DSC according to the test method of ASTM D-3418.

An especially preferred commercially available thermoplastic is highly crystalline isotactic or syndiotactic polypropylene. This polypropylene generally has a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate is highly preferred. These polypropylene resins are characterized by a melt flow rate that is less than or equal to 35 dg/min, and preferably less than or equal to 5.0 dg/min, and more preferably less than 1.2 dg/min, and most preferably less than or equal to 0.8 dg/min per ASTM D-1238. Melt flow rate is a measure of how easily a polymer flows under standard pressure, and is measured by using ASTM D-1238 at 230° C. and 2.16 kg load.

Though thermoplastic vulcanizates may be formed with any of the above referenced thermoplastics, and it is not the intention to restrict the types of suitable thermoplastics except as otherwise expressly provided herein, polypropylene, and more specifically, isotactic polypropylene, is the most widely used thermoplastic in TPVs and is the exemplary thermoplastic of the examples below.

Common additives, which may be incorporated in selected amounts in the first chamber may include, among others known in the art, reinforcing and non-reinforcing fillers, fibers (like glass, carbon fibers or carbon fibrils), processing oils, extender oils, plasticizers, waxes, stabilizers, antioxidants, cross-linking agents, processing aids, lubricants, foaming agents, flame retardant packages, pigments and other coloring agents. Fillers and extenders which can be utilized include conventional inorganic substances, such as calcium carbonate, clays, silica, talc, titanium dioxide, carbon black and the like. Some materials, such as some fillers, can serve a plurality of functions. For instance, antimony trioxide can function as a filler and also provide, preferably in combination with other materials, some flame retardancy to the present thermoplastic elastomer composition. In general, suitable rubber processing oils are paraffinic, naphthenic or aromatic oils derived from petroleum fractions. The type of the oil selected can be one that ordinarily is used in combination with the specific rubber or rubbers in the present composition. These additives can comprise a significant amount of the total formulated composition. More particularly, when present, one or more additives can be present in amounts greater than 0 parts per hundred rubber (phr) to approximately 150 phr and more generally up to about 300 phr, relative to the complete formulated composition.

Additives may also include curing agents and curing co-agents, which are well known in the art. The selection of curing agents and co-agents will depend on the preferred cure method selected for the particular TPV composition. Suitable curing methods for TPV's include, among others, peroxide cure, sulfur cure, resin cure, and hydrosilylation cure. The curing system used to accomplish partial or complete crosslinking of the blend composition may comprise organic peroxides, sulfur, metal alkylates, epoxies, amines, azides, phenolic resin curing agents, metal oxides, quinone derivatives and the like.

Examples of organic peroxides that may be used as peroxide curing agents include di-tert-butyl peroxide, dicumyl peroxide, t-butylcumyl peroxide, alpha-alpha-bis(tert-butylperoxy)diisopropyl benzene, 2,5-dimethyl-2,5-di(t-butylperoxy)hexane, 1,1-di(t-butylperoxy)-3,3,5-trimethyl cyclohexane, n-butyl-4,4-bis(tert-butylperoxy)valerate, benzoyl peroxide, lauroyl peroxide, dilauroyl peroxide, 2,5-dimethyl-2,5-di(tert-butylperoxy)-hexene-3, and in general, diaryl peroxides, ketone peroxides, peroxydicarbonates, peroxyesters, dialkyl peroxides, hydroperoxides, peroxyketals and combinations thereof. Azo initiators such as Luazo® AP (available from ATO Chemical) may also be used as free radical initiators.

In addition to the peroxide, other cure adjuvants or coagents can be used to initiate or accelerate the cross-linking reaction. Examples are triallyl cyanurate ("TAC"), triallyl isocyanurate, triallyl phosphate, sulfur, N-phenyl-bis-maleamide, zinc diacrylate, zinc dimethacrylate, divinylbenzene, 1,2-polybutadiene, trimethylol-propane-trimethacrylate ("TMPTMA"), tetramethylene glycol diacrylate, trifunctional acrylic ester, dipentaerythritolpentacrylate, polyfunctional acrylate, polyfunctional methacrylates, acrylate and methacrylate metal salts, and oximer, e.g. quinone dioxime.

Continuing with the first processing step, in one embodiment, it is contemplated that the thermoplastic vulcanizate base formed at the conclusion of the first processing step will constitute a complete thermoplastic vulcanizate. By "complete", it is meant that the thermoplastic vulcanizate base will have the full amounts of thermoplastic, elastomer, and additives to produce a fully cured thermoplastic vulcanizate having a desired final hardness of between 40 and 80 Shore A without the need of additional thermoplastic in a later processing step. In another embodiment, however, it is contemplated that the thermoplastic vulcanizate base formed at the conclusion of the first processing step will be a rubber concentrate TPV base to which additional thermoplastic may be blended following addition of the curing agent to achieve a desired final hardness. The rubber concentrate TPV base is generally a soft material (<50 Shore A) comprising only a portion of thermoplastic combined with the full amount of the elastomer. Additional amounts of thermoplastic may be added to the rubber concentrate TPV base in the second processing step (described below).

It is thus contemplated that in one embodiment, from about 20 to about 95 percent by weight of an elastomer may be added to the first chamber; which may be a three-lobe, two screw extruder. Unless otherwise indicated, when referring to amounts of the elastomer or thermoplastic, the term "percent by weight" or "weight percent" refers to the percent of the respective elastomer or thermoplastic to the total amount of the elastomer plus thermoplastic in the TPV. In other embodiments, the amount of elastomer may be from about 30 to about 90 weight percent, and in yet other embodiments, from about 50 to about 85 weight percent.

An amount of thermoplastic may be added to the first chamber. In one embodiment, the amount of thermoplastic may be from about 5 to about 80 weight percent, and in another embodiment, from about 10 to about 70 weight percent, and in another embodiment from about 15 to about 50 weight percent.

The first amount of the thermoplastic may be added to the first chamber, with the elastomer, before the addition of the curing agent. Alternatively, the first amount of the thermoplastic may be split into a first portion of thermoplastic and a second portion of thermoplastic. The first portion of thermoplastic may be added to the first chamber prior to the addition of the curing agent and the second portion of the thermoplastic may be added to the first chamber following the addition of the curing agent. As described in further detail below, the second portion of thermoplastic may alternatively be added in the second processing step, rather than in the first processing step.

The first portion of the thermoplastic may be 100% of total amount of the thermoplastic, whereupon, the second portion of the thermoplastic would be 0% of the total amount of thermoplastic. In another embodiment, the first portion of the thermoplastic may be from about 5 to about 95% of the total amount of thermoplastic added to the TPV, during the first and second processing steps, with the remainder of the polyolefin contained in the second portion. In another embodiment, the first portion of thermoplastic may be less than about 80% of the total thermoplastic, and in yet another embodiment, less than about 65% and in still another embodiment, less than about 50%, and in still further embodiments, less than 45%, 40%, 35%, 30%, 25%, 20%, 15% and 10% respectively, with the remainder of the thermoplastic contained in the second portion. The amount of thermoplastic in the first portion may be selected to achieve a desired hardness or softness in the TPV base prior to the addition of the second portion of thermoplastic.

In addition to the amount of elastomer and the first portion of the thermoplastic, selected amounts of one or more additives may also be added into the first chamber. The specific additives and associated amounts may be selected to improve or impart certain desirable physical characteristics or properties to the TPV base or resulting final TPV.

Suitable amounts of curing agents, and, as appropriate, curing co-agents, may be added to the first chamber. It is desirable that an amount of curing agent suitable to substantially fully cure the elastomer be added to the first chamber. These amounts will necessarily vary based on the specific elastomer selected and the amount of elastomer in the TPV. Suitable amounts of curing agents necessary to substantially fully cure the elastomer are well known in the art. An exemplary curing process is a peroxide curing process in which the preferred curing agent may be 2,5-dimethyl-2,5-di(t-butylperoxy)hexane, in amounts of about 1 to about 5 phr.

In one embodiment, the amounts of curing agent and curing co-agent may be added to the first chamber substantially at the same time as the elastomer and the first portion of the thermoplastic. That is to say, the ingredients of the TPV base, including the elastomer, first portion of the thermoplastic, curing agents, co-agents and other additives, may be added at the beginning of first processing step. In an alternate embodiment, it may be desirable to add the curing agent after at least the elastomer and the first portion of the thermoplastic have mixed in the first chamber for a period of time Following the addition of the curing agent to the first chamber, which may be at the beginning of the first processing step, or after the a period of time of blending described above, the first chamber may be substantially devolatalized to remove volatiles, including volatiles derived from the curing agent, from the first chamber.

The first chamber may be devolatalized by providing the first chamber with a vacuum port, to which a vacuum may be attached for removing volatiles from the interior of the first chamber. Desirable vacuum pressure for devolatilization is higher than 20 psig.

To assist in the devolatalization of the first chamber-following the addition of the curing agent, but prior to the removal of volatiles by means of the vacuum—a stripping agent may be added to the chamber to assist in stripping excess curing agent and other volatiles from the chamber. Suitable stripping agents may include water, carbon dioxide, and nitrogen.

The preferred stripping agent and the preferred amounts of stripping agent(s) will depend on the particular curing system adopted, the selected curing agents and co-agents adopted, and the various other ingredients of the TPV base. In a process wherein EP(VNB)DM is the elastomer and polypropylene is the thermoplastic and an organic peroxide is selected as the curing agent, the stripping agent is water in a preferred embodiment. When present, amounts of stripping agent range from about 0.01 to about 10 phr, though greater amounts may be added.

Following the devolatalization of the first chamber, it may be desirable to add some or all of the second portion of the thermoplastic to the first chamber. In one embodiment, the second portion of the thermoplastic may be pre-heated to melt the thermoplastic prior to its addition to the first chamber. In accordance with this embodiment, the second portion of thermoplastic may be heated in an extruder and extruded into the first chamber. In an alternate, less preferred embodiment, the second portion of the thermoplastic may be added to the first chamber without pre-heating.

The first processing step may include stages of blending, heating, cooling, and the like such as are well known in the art. Preferred arrangements of stages in the first processing step include: masticating of rubber with other additives including peroxide, melting and mixing of thermoplastic, dynamic curing, mixing other additives, venting for devolatilization, melt filteration, and cooling and pelletization.

An initial blending stage of the elastomer, the first portion of the thermoplastic, and the amounts of selected additives. Following the initial blending stage, there may be second blending stage substantially commencing with the addition of the curing agent. It is noted that the addition of the curing agent may be deemed the conclusion of the initial blending stage. In one embodiment, the length of the second blending stage may depend on the half-life of the selected curing agent. In this embodiment, the length of time may be between about three to five, or more, times of the half-life of the curing agent. By "half-life" it is meant the amount of time for one-half of the curing agent to be used up in vulcanizing the elastomer A third blending stage of the first processing step may commence with the addition of the second portion of the thermoplastic to the first chamber. Devolatalization with or without addition of the stripping agent may take place in the second blending stage.

On completion of the first processing step, the TPV base, which will comprise the first portion of thermoplastic and fully cured elastomer, may be pelletized. The process of pelletization is described in Herman F. Mark, et al, 10 ENCYCLOPEDIA OF POLYMER SCIENCE AND ENGINEERING, 802-810 (2004) and involves creating pellets from (generally spherical or cylinder) the, generally, semi-molten thermoplastic vulcanizate base. The pellets may have a size having a diameter ranging between about 0.5 millimeter and about 10 millimeters and a length ranging between about 0.5 millimeters and about 10 millimeters. The most preferred TPV rubber pellets will have a size that is about 2.5 millimeters in diameter and about 3.0 millimeters in length.

The pelletized TPV base may be cooled to solidify the pellets. The TPV base may be actively or passively cooled.

Though the above description contemplates pelletizing the TPV base before cooling to solidify the TPV base, it is contemplated that the TPV base could be solidified prior to being pelletized.

The second processing step will now be described. In a second chamber, an amount of the solid TPV base pellets may be added. As with the first chamber, the second chamber may be a mixer, such as a Banbury™ mixer, or a mill, or an extruder. According to one embodiment, the second chamber is an extruder, which may be a multi-screw extruder, with two- and three-screw extruders being exemplary and two or twin-screw extruders being preferred for the second processing step. The screws of the extruder may have a plurality of lobes; two lobe screw elements being preferred, though it will be understood that other screw designs may be selected in accordance with the methods of the present invention As described above, the TPV base may, by the end of the first processing step, contain the full measure of elastomer and thermoplastic to achieve a TPV having a desired hardness or set of physical properties. In this embodiment, the thermoplastic may have all been added in the first processing step, whether in a single portion at the initial blending stage, or in two distinct portions, as discussed above. In an alternate embodiment, the TPV base may, by the end of the first processing step, be a rubber concentrate TPV base in which the full measure of thermoplastic, which may be the second portion of the thermoplastic, has not yet been added to the TPV base.

In accordance with the first embodiment described in the previous paragraph, the second processing step may involve simply reprocessing the TPV base in the second chamber, preferably, the second chamber being a two lobe, twin-screw extruder. This may be referred to as a re-pass process. A second devolatalization step, as previously described, may be introduced with or without a further amount of stripping agent in the course of the second processing step to further remove volatiles that may remain or be created as a result of the second processing step.

Alternatively, an amount of the pelletized TPV base, which may be an amount of the rubber concentrate TPV base, may be added to the second chamber with the second portion of the thermoplastic. The second portion of the thermoplastic may be preheated to melt the thermoplastic prior to addition to the second chamber; however, the second portion of the thermoplastic may be added to the second chamber without being pre-heated.

The TPV base and the second portion of thermoplastic may be melt blended in the second chamber. Prior to extrusion of the TPV from the second chamber, a second devolatalization step may be introduced to the second chamber. In one embodiment, the devolatalization step may be implemented prior to the addition of the second portion of thermoplastic. In an alternate embodiment, the devolatalization step may be implemented following the addition of the second portion of thermoplastic.

Additional amounts of additives may be added to the TPV base during the second processing step. It may be desirable to add additional amounts of process oils during the second processing step, though additional amounts of fillers, stabilizers and other additives may be added. It is preferable that additional curing agents not be added during the second processing step. In this respect, it is preferable that the elastomer in the TPV base will be fully cured before the TPV base is added to the second chamber.

Embodiments of the present method having been described above, it will be understood that the present invention relates to TPVs formed according to the methods described above.

EXAMPLES

To further elucidate the improvement in ESR resulting from the methods outlined above, the following Examples are offered.

In reference to the Examples below, Sample and Comparative TPVs were formed by means of a one-pass or two-pass process in one or more of a Werner & Pfleiderer twin screw extruder (model ZSK-83), Coperion twin screw extruder (model ZSK-70), or Berstorff twin screw extruder (model ZE-40A). Extruder ZSK-83 is a fifteen barrel, 83.4 mm inner barrel diameter extruder having an extrusion output of 270 kg/hr and 350 rpm. Extruder ZSK-70 is a ten barrel, 70 mm inner barrel diameter extruder having an extrusion output of 500 kg/hr and 450 rpm. Extruder ZE-40A is a nine barrel, 43 mm inner barrel diameter extruder having an extrusion output of 30 kg/hr and 250 rpm. The temperature profiles of the respective extruders noted below:

|  | Barrel | | | | | | | | | | | | | | |
| --- | --- | --- | --- | --- | --- | --- | --- | --- | --- | --- | --- | --- | --- | --- | --- |
|  | #1 | #2 | #3 | #4 | #5 | #6 | #7 | #8 | #9 | #10 | #11 | #12 | #13 | #14 | #15 |
| ZSK-83 | 60 | 130 | 130 | 130 | 120 | 120 | 120 | 120 | 120 | 130 | 130 | 130 | 130 | 145 | 160 |
| ZSK-70 | 60 | 210 | 210 | 200 | 190 | 180 | 175 | 170 | 165 | 160 | — | — | — | — | — |
| ZE-40A | 160 | 160 | 160 | 160 | 160 | 160 | 155 | 180 | 135 | — | — | — | — | — | — |

Extruder temperature profiles (° C.)

For purposes of the Examples, ESR was measured as follows:

Approximately 1 kg (2 lbs.) of the TPV to be tested was fed into a 1" or 1½" diameter extruder equipped with a 24:1 L/D screw having a 3.0 to 3.5 compression ratio. The extruder was fitted with a strip die 25.4 mm (1") wide×0.5 mm (0.019") thick×7 to 10 mm (0.25 to 0.40") land length. A breaker plate was used with the die, but no screen pack was placed in front of the breaker plate. Temperature profiles of the extruder were as follows: Zone 1=180° C.–(feed zone); Zone 2=190° C. (feed zone); Zone 3=200° C. (feed zone); Zone 4=205° C. (die zone). When the zone temperatures were reached, the screw was activated. Screw speed was set to maintain an output of approximately 50 grams per minute. After flushing the extruder for 5 minutes, the extruded material was discarded and a strip approximately 30.5 cm (12") in length was extruded on a flat substrate placed directly under and touching the under side of the die. Three representative samples were collected in this manner. ESR was measured on the samples using a model EMD-04000-W5 Surfanalyzer System 4000 including a universal probe 200 mg stylus force and a Surfanalyzer probe tip type EPT-01049 (0.025 mm [0.0001"] stylus radius).

Ultimate Tensile Strength (UTS) and Ultimate Elongation at Break (EB) was determined according to ASTM D-412 at 23° C. by using an Instron™ testing machine.

Hardness (HD) was determined according to ISO 868 and ASTM D2240.

Weight gain (WtGn) was determined according to ASTM D-471@121° C. and 24 hours.

Example 1

Example 1 demonstrates the improvements in ESR and other physical and processing properties that are achieved in a colorable grade, EP(VNB)DM, TPV using the two-step processing method described herein (Sample TPVs), versus a conventional single step or one pass processing method (Comparative TPVs).

Sample TPVs 1, 2, 3, and 4 were prepared as follows:

200 parts by weight of EP(VNB)DM rubber stock (VX1696 from ExxonMobil Chemical Co., ethylene 63%, propylene 36.3%, VNB 0.7% by weight, 100 parts of rubber preblended with 100 parts of Sunpar 150 LW paraffinic oil) were fed into a ZSK-83 twin lobe extruder (as previously described) with 25 parts by weight paraffinic oil, 42 parts by weight clay, 1.94 parts by weight Zinc Oxide, 3 parts by weight coagent triallyl cyanurate (TAC), 2 parts by weight antioxidant, and a pre-cure amount (31, 26, 21, and 18 parts by weight respectively) of thermoplastic polypropylene. Each amount is based on 100 parts by weight of EPDM rubber.

After a period of melt blending in the extruder, 6.5 parts by weight of a peroxide curing agent (2,5-dimethyl-2,5-di(t-butylperoxy)hexane) was injected into the extruder (between barrel #3 and #4). Volatiles were vacuumed from the extruder through a vacuum post located on extruder barrel #7 and 14.

The resultant TPV base material was pelletized using an underwater pelletizer and the TPV pellets were cooled to completely solidify.

The pelletized Sample TPV base material and a second, post cure portion of pelletized polypropylene, (28, 33, 38, and 41 parts by weight respectively), were fed into the feed throat of a ZSK-70 twin lobe extruder (previously described). Volatiles were vacuumed from the extruder at barrel #5 and 8 as previously described.

Comparative TPVs 1, 2, and 3 were prepared in a similar manner to the Sample TPVs, with the exception that the second, post cure portion of polypropylene (28, 33, and 38 parts by weight respectively) was pre-melted and fed into the first extruder (ZSK-83) following rubber vulcanization.

Figure 1:
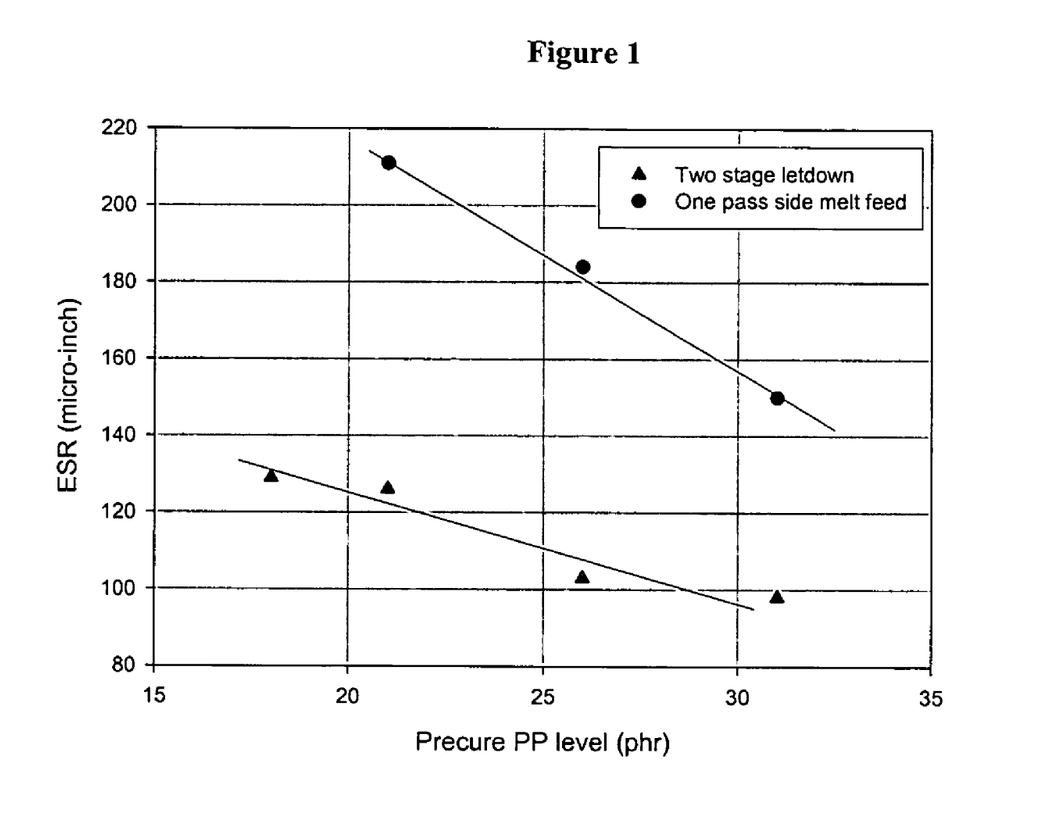
FIG. 1 is a graphical representation of Extrusion Surface Roughness ("ESR") as a function of pre-cure polypropylene of Example 1.

Table 1 summarizes the physical property data measured with respect to the Comparative and Sample TPVs. FIG. 1 is a graph visualizing ESR versus the pre-cure polypropylene level.

Table 1 demonstrates that tensile strength improved as a result of the two-step processing of the Sample TPVs. Elongation improved slightly in the Sample TPVs. ESR was significantly improved in the Sample TPVs. Further, moisture content was reduced in the Sample TPVs, likely as a result of the second devolatalization step.

FIG. 1 demonstrates that each Sample TPV showed improved ESR compared to its respective Comparative TPV and suggests that the improvement in ESR may be relatively greater in TPVs having a lower pre-cure polypropylene level, but that ESR is absolutely higher in TPVs having lower pre-cure polypropylene levels.

TABLE 1

|  |  | Sample #1 | Comparative #1 | Sample #2 | Comparative #2 | Sample #3 | Comparative #3 | Sample #4 |
|---|---|---|---|---|---|---|---|---|
| Process |  | Two stage | One pass | Two stage | One pass | Two stage | One pass | Two stage |
| 1$^{st}$ Extruder |  | ZSK83 | ZSK83 | ZSK83 | ZSK83 | ZSK83 | ZSK83 | ZSK83 |
| 2$^{nd}$ Extruder |  | ZSK70 |  | ZSK70 |  | ZSK70 |  | ZSK70 |
| Vacuum |  | ○ | ○ | ○ | ○ | ○ | ○ | ○ |
| Water |  | X | X | X | X | X | X | X |
| Precure PP in 1st Extruder | phr | 31 | 31 | 26 | 26 | 21 | 21 | 18 |
| Postcure PP added in 1$^{st}$ Extruder | phr |  | 28 |  | 33 |  | 38 |  |
| Postcure PP added in 2$^{nd}$ Extruder | phr | 28 |  | 33 |  | 38 |  | 41 |
| HD | Shore A | 68.5 | 65.5 | 68.6 | 67.3 | 69.9 | 67.0 | 70.8 |
| UTS | psi | 925 | 859 | 990 | 976 | 1058 | 1013 | 1078 |
| UE | % | 532 | 485 | 541 | 518 | 545 | 505 | 547 |
| Wt Gn | % | 124 | 117 | 121 | 116 | 115 | 116 | 117 |
| ESR | μ inch | 98 | 150 | 103 | 184 | 126 | 211 | 129 |

○ = present
X = absent

Example 2

Example 2 demonstrates the improvement in ESR and other physical properties that is achieved in a black grade TPV using a two step processing method described herein, versus a conventional one pass processing method.

Sample TPVs 5, 6, 7, 8, and 9 were prepared essentially as described above with respect to Sample TPVs 1-4. In each case 200 parts of EP(VNB)DM rubber (VX1696) was blended in a ZSK-83 extruder with a pre-cure portion of polypropylene (21 parts by weight), 25 parts by weight paraffinic oil, 42 parts by weight clay, 1.94 parts by weight Zinc Oxide, 3 parts by weight of a coagent (TAC or trimethylol propane trimethacrylate (TMPTMA)) as indicated in Table 2), and 2 parts by weight of an antioxidant.

After a period of melt blending in the extruder, 6.5 parts by weight of a peroxide curing agent (2,5-dimethyl-2,5-di(t-butylperoxy)hexane) was injected into the extruder (between barrel #3 and #4). Volatiles were vacuumed from the extruder through a vacuum post located on extruder barrel #7 and 14. In TPV Sample 8 only, 1 part of water was added to the extruder barrel as a stripping agent during the devolatilization step.

The resultant Sample TPV base materials were pelletized and solidified as described above. The pelletized Sample TPV base materials and a second, post cure portion of pelletized polypropylene (24.6 parts by weight) and a post cure portion of a carbon black masterbatch (40% carbon black in polypropylene) (24.4 parts by weight), were fed into the feed throat of a second extruder, the type of which is indicated in Table 2 and described above.

The Comparative TPV 4 was prepared in a same manner as Sample TPV 5, except that the post cure portion of polypropylene and carbon black masterbatch were fed into the first extruder (ZSK-83) following rubber vulcanization.

Physical property measurements, including ESR, hardness, tensile strength and elongation were recorded on the Sample and Comparative TPVs and are summarized in Table 2.

Table 2 demonstrates that ESR was significantly improved in the Sample TPVs and, as between TAC and TMPTMA as the curing co-agent, was better with TMPTMA s the curing co-agent.

TABLE 2

|  |  | Sample #5 | Sample #6 | Sample #7 | Sample #8 | Sample #9 | Comparative #4 |
|---|---|---|---|---|---|---|---|
| Process |  | Two stage | Two stage | Two stage | Two stage | Two stage | One pass |
| 1$^{st}$ Extruder |  | ZSK83 | ZSK83 | ZSK83 | ZSK83 | ZSK83 | ZSK83 |
| 2$^{nd}$ Extruder |  | ZSK70 | ZSK70 | ZE40A | ZE40A | ZE40A | — |
| Vacuum |  | ○ | ○ | ○ | ○ | ○ | ○ |
| Water |  | X | X | X | ○ | X | X |
| Co-agent |  | TAC | TMPTMA | TAC | TAC | TMPTMA | TAC |
| Precure PP In 1$^{st}$ Extruder | phr | 21 | 21 | 21 | 21 | 21 | 21 |
| Postcure PP added in 1$^{st}$ | phr | — | — | — | — | — | 24.6 |

TABLE 2-continued

|  |  | Sample #5 | Sample #6 | Sample #7 | Sample #8 | Sample #9 | Comparative #4 |
|---|---|---|---|---|---|---|---|
| Extruder Postcure Carbon Black MB added in $2^{nd}$ Extruder | phr | — | — | — | — | — | 24.4 |
| PP added in $2^{nd}$ Extruder | phr | 24.6 | 24.6 | 24.6 | 24.6 | 24.6 | — |
| Carbon Black MB added in $2^{nd}$ Extruder | phr | 24.4 | 24.4 | 24.4 | 24.4 | 24.4 | — |
| HD | Shore A | 68.8 | 70.4 | 68.4 | 69.0 | 70.8 | 67.2 |
| UTS | psi | 1063 | 1093 | 1023 | 1023 | 1113 | 1048 |
| UE | % | 513 | 445 | 488 | 482 | 445 | 495 |
| Wt Gn | % | 116 | 101 | 117 | 117 | 102 | 113 |
| ESR | μ pinch | 165 | 107 | 146 | 158 | 103 | 317 |

○ = present
X = absent

Example 3

Example 3 demonstrates the improvements in ESR and other physical and processing properties that are achieved in an EP(ENB)DM TPV using the two-step processing method described herein (Sample TPVs 10-16), versus a conventional single step or one pass processing method (Comparative TPVs 5-7)).

Sample and Comparative TPVs were prepared according to the conventions and compositions described above in relation to Examples 1 and 2 except that EP(ENB)DM rubber (Vistalon™ 3666 from ExxonMobil Chemical Co.) was used in place of the EP(VNB)DM of Examples 1 and 2. For purposes of the Comparative TPVs, the post-cure polypropylene portion was added to the first extruder, as previously described, whereas, in the Sample TPVs, the post-cure portion was added to the second extruder, as previously described.

Physical property measurements, including ESR, hardness, tensile strength and elongation were recorded on the Sample and Comparative TPVs and are summarized in Table 3.

As demonstrated in Table 3, improvement in ESR was seen in the EP(ENB)DM rubber TPVs using the two pass process.

TABLE 3

|  |  | Sample #10 | Comparative #5 | Sample #11 | Sample #12 | Sample #13 | Sample #14 | Comparative #6 | Sample #15 | Sample #16 | Comparative #7 |
|---|---|---|---|---|---|---|---|---|---|---|---|
| Process |  | Two-stage | One pass | Two-stage | Two-stage | Two-stage | Two-stage | One pass | Two-stage | Two-stage | One pass |
| $1^{st}$ Extruder |  | ZSK83 | ZSK83 | ZSK83 | ZSK83 | ZSK83 | ZSK83 | ZSK83 | ZSK83 | ZSK83 | ZSK83 |
| $2^{nd}$ Extruder |  | ZE40A | — | ZE40A | — | ZE40A | — | ZE40A | — | ZE40A | — |
| Vacuum |  | ○ | ○ | X | ○ | ○ | ○ | ○ | ○ | ○ | ○ |
| Water |  | ○ | X | X | X | ○ | ○○ | X | X | ○ | X |
| Precure PP | Phr | 42 | 41 | 32 | 32 | 32 | 32 | 31 | 27 | 27 | 21 |
| Postcure PP | Phr | 17 | 18 | 27 | 27 | 27 | 27 | 28 | 32 | 32 | 38 |
| HD | Shore A | 70.4 | 67.4 | 71.6 | 71.9 | 72.3 | 73.6 | 69.6 | 74.4 | 74.4 | 70.5 |
| UTS | psi | 786 | 735 | 882 | 895 | 917 | 878 | 887 | 968 | 1005 | 924 |
| UE | % | 457 | 471 | 468 | 479 | 484 | 442 | 539 | 480 | 500 | 512 |
| Wt Gn | % | 107 | 116 | 101 | 84 | 97 | 95 | 110 | 92 | 95 | 105 |
| ESR | μ inch | 40 | 58 | 56 | 60 | 65 | 66 | 65 | 79 | 84 | 136 |

○ = present
○○ = double portion added
X = absent

Example 4

Example 4 demonstrates the effect of a conventional re-pass following pelletization in improving ESR in both EP(ENB)DM based TPVs and EP(VNB)DM based TPVs.

Each Sample and Comparative TPV was prepared according to the conventions described previously. Sample TPV's 17, 18, 19, 20, 21, and 22 were prepared in a single processing step. Each of the respective Sample TPVs were pelletized and solidified as described above. Each respective pelletized Sample TPV was placed into the feed throat of a ZE40A extruder and melt reprocessed without addition of further materials. Following of reprocessing, the TPV was extruded and ESR values were measured and the data is recorded in Tables 4 and 5. Tables 4 and 5 demonstrate that ESR was significantly improved in the sample TPVs relative to their respective comparative example TPVs.

TABLE 4

|  |  | Sample #17 | Comparative #8 | Sample #18 | Comparative #9 | Sample #19 | Comparative #10 |
|---|---|---|---|---|---|---|---|
| Process |  | re-pass | one pass | re-pass | one pass | re-pass | one-pass |
| 1st Extruder |  | ZSK83 | ZSK83 | ZSK83 | ZSK83 | ZSK83 | ZSK83 |
| 2nd Extruder |  | ZE40A | — | ZE40A | — | ZE40A | — |
| Vacuum |  | ○ | ○ | ○ | ○ | ○ | ○ |
| Water |  | X | X | X | X | X | X |
| EPDM Type |  | VNB EPDM | VNB EPDM | ENB EPDM | ENB EPDM | ENB EPDM | ENB EPDM |
| HD | Shore A | 69.4 | 72.8 | 72.2 | 73.2 | 68.3 | 69.3 |
| UTS | psi | 954 | 1025 | 1029 | 1005 | 888 | 896 |
| UE | % | 400 | 441 | 472 | 423 | 371 | 359 |
| Wt Gn | % | 101 | 90 | 94 | 87 | 91 | 87 |
| ESR | micro-inch | 73 | 94 | 89 | 123 | 101 | 152 |

○ = present
X = absent

TABLE 5

|  |  | Comparative #11 | Sample #20 | Sample #21 | Comparative #12 | Sample #22 |
|---|---|---|---|---|---|---|
| Process |  | One pass | Re-pass | Re-pass | One pass | Re-pass |
| 1st Extruder |  | ZSK83 | ZSK83 | ZSK83 | ZSK83 | ZSK83 |
| 2nd Extruder |  | — | ZE40A | ZE40A | — | ZE40A |
| Vacuum |  | ○ | ○ | ○ | ○ | ○ |
| Water |  | X | X | ○ | X | X |
| EPDM Type |  | VNB EPDM | VNB EPDM | VNB EPDM | VNB EPDM | VNB EPDM |
| ESR | micro-inch | 154 | 84 | 93 | 114 | 87 |

○ = present
X = absent

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

1. One aspect of the invention is to a method of forming a thermoplastic vulcanizate comprising the steps of: (A) forming a thermoplastic vulcanizate base, wherein the step of forming the thermoplastic vulcanizate base comprises the steps of: (1) placing an amount of an elastomer in a first chamber; (2) placing a first portion of a thermoplastic in the first chamber; (3) blending the elastomer and the first portion of the thermoplastic in the first chamber; (4) adding an amount of a curing agent to the first chamber; (5) blending the elastomer, the first portion of thermoplastic and the curing agent to at least partially cure the elastomer; (B) pelletizing the thermoplastic vulcanizate base; (C) solidifying the pelletized thermoplastic vulcanizate base; (D) placing an amount of the thermoplastic vulcanizate base into a second chamber; (E) melt shearing the thermoplastic vulcanizate base in the second chamber; and (F) extruding the thermoplastic vulcanizate from the second chamber.

2. In another embodiment of the method 1, the first and second chambers are first and second multiple screw extruders; and wherein the first multiple screw extruder is a three lobe multiple screw extruder.

3. In another embodiment of the method 2, the second multiple screw extruder is a two lobe multiple screw extruder.

4. In another embodiment of any one of methods 1 to 3, the first chamber and the second chamber are the same chamber; and the chamber is an extruder.

5. In yet another embodiment of any one of the methods 1 to 4, the step of forming the thermoplastic vulcanizate base further comprises the step of devolitizing the thermoplastic vulcanizate base during the step of blending the elastomer, the first portion of thermoplastic and the curing agent.

6. In yet another embodiment of any one of the methods 1 to 5, the step of devolitizing the thermoplastic vulcanizate base comprises the steps of: adding at least a first stripping agent to the first chamber; and vacuuming volatiles from the first chamber.

7. In yet another embodiment of any one of the methods 1 to 6, the at least a first stripping agent is selected from the group consisting of nitrogen, water, and carbon dioxide.

8. Yet another embodiment of any one of the methods 1 to 7, further comprises the step of adding a second portion of the thermoplastic to the first chamber, following the step of adding the curing agent to the first chamber.

9. Yet another embodiment of any one of the methods 1 to 8, further comprises the step of adding a second portion of the thermoplastic to the second chamber.

10. In yet another embodiment of any one of the methods 1 to 9, the elastomer is EP(VNB)DM; and the thermoplastic is polypropylene.

11. Another aspect of the invention is to a method of forming a thermoplastic vulcanizate comprising the steps of: (A) forming a thermoplastic vulcanizate base, wherein the step of forming the thermoplastic vulcanizate base comprises the steps of: (1) blending, in a first multiple screw extruder, an elastomer, a first portion of thermoplastic, and a curing agent; and (2) devolitizing the thermoplastic vulcanizate base; (B) pelletizing the thermoplastic vulcanizate base; (C) solidifying the pelletized thermoplastic vulcanizate base (D) reprocessing the pelletized thermoplastic vulcanizate base to form the (E) thermoplastic vulcanizate, wherein the step of reprocessing the thermoplastic vulcanizate base comprises the steps of (1) melt blending, in a second multiple screw extruder, an amount of the thermoplastic vulcanizate base and a second portion of the thermoplastic; and (2) devolitizing the thermoplastic vulcanizate; and (F) extruding the thermoplastic vulcanizate from the second multiple screw extruder.

12. In another embodiment of method 11, the first portion of the thermoplastic is from about 5 to about 80 percent by weight with respect to the thermoplastic vulcanizate base.

13. In yet another embodiment of methods 11 to 12, the second portion of the thermoplastic is greater than 50% of total amount of thermoplastic added to the thermoplastic vulcanizate.

14. In yet another embodiment of methods 11 to 13, wherein the thermoplastic vulcanizate base has a hardness of less than about 50 Shore A.

15. In yet another embodiment of methods 11 to 14, wherein the curing agent is a peroxide curing agent.

I claim:

1. A method for forming a thermoplastic vulcanizate, comprising
blending an elastomer and a first portion of a thermoplastic in a first chamber;
adding a curing agent to the first chamber in an amount sufficient to at least partially cure the elastomer;
blending the elastomer, the first portion of thermoplastic, and the curing agent to provide an at least partially cured thermoplastic vulcanizate base;
pelletizing the thermoplastic vulcanizate base;
solidifying the pelletized thermoplastic vulcanizate base;
melt shearing the thermoplastic vulcanizate base in a second chamber; and
extruding the thermoplastic vulcanizate.

2. The method of claim 1 wherein the first and second chambers are first and second multiple screw extruders; and wherein the first multiple screw extruder is a three lobe multiple screw extruder.

3. The method of claim 2, wherein the second multiple screw extruder is a two lobe multiple screw extruder.

4. The method of claim 1, wherein the first chamber and the second chamber are the same extruder.

5. The method of claim 1, further comprising devolitizing the thermoplastic vulcanizate base prior to pelletizing the thermoplastic vulcanizate base.

6. The method of claim 5, wherein devolitizing the thermoplastic vulcanizate base comprises adding at least a first stripping agent to the first chamber; and vacuuming volatiles from the first chamber.

7. The method of claim 6, wherein the first stripping agent is selected from the group consisting of nitrogen, water, and carbon dioxide.

8. The method of claim 1, further comprising adding a second portion of the thermoplastic to the first chamber after the curing agent is added to the first chamber.

9. The method of claim 1, further comprising adding a second portion of the thermoplastic to the second chamber.

10. The method of claim 1, wherein the elastomer is EP(VNB)DM and the thermoplastic is polypropylene.

11. A method for forming a thermoplastic vulcanizate, comprising:
(A) forming a thermoplastic vulcanizate base by blending, in a first multiple screw extruder, an elastomer, a first portion of a thermoplastic, and a curing agent; and devolitizing the blend;
(B) pelletizing the thermoplastic vulcanizate base;
(C) solidifying the pelletized thermoplastic vulcanizate base;
(D) melt blending, in a second multiple screw extruder, an amount of the solidified, pelletized thermoplastic vulcanizate base and a second portion of the thermoplastic;
(E) devolitizing the thermoplastic vulcanizate; and
(F) extruding the thermoplastic vulcanizate from the second multiple screw extruder.

12. The method of claim 11, wherein the elastomer is an ethylene/propylene rubber and the thermoplastic is polypropylene.

13. The method of claim 11, wherein the first portion of the thermoplastic is from about 5 to about 80 percent by weight with respect to the thermoplastic vulcanizate base.

14. The method of claim 11, wherein the second portion of the thermoplastic is greater than 50% of total amount of thermoplastic added to the thermoplastic vulcanizate.

15. The method of claim 11, wherein the thermoplastic vulcanizate base has a hardness of less than about 50 Shore A.

16. The method of claim 11, wherein the curing agent is a peroxide curing agent.

17. The method of claim 12, wherein the elastomer is EP(VNB)DM.

18. A method for forming a thermoplastic vulcanizate comprising:
(A) a first processing step comprising:
(1) blending, in a first chamber, an amount of ethylene/propylene rubber wherein the amount of the ethylene/propylene rubber is from between 20 to about 80 weight % of the blend, and a first portion of polypropylene wherein the first portion of polypropylene is from about 80 to about 20 weight % of the blend;
(2) adding a peroxide curing agent to the first chamber;
(3) blending the ethylene/propylene rubber and the first portion of polypropylene until the ethylene/propylene rubber is at least partially cured; and
(4) solidifying the blend of the ethylene/propylene rubber and the first portion of polypropylene; and
(B) a second processing step comprising blending, in a second chamber, an amount of the blend of the ethylene/propylene rubber and the first portion of polypropylene, and a second portion of polypropylene.

19. The method of claim 18, wherein the second portion of polypropylene is from about 5 to about 90% of the total polypropylene added to the thermoplastic vulcanizate.

20. The method of claim 19, wherein the second portion of polypropylene is solid when added to the second chamber.

21. The method of claim 18, wherein the ethylene/propylene rubber is EP(VNB)DM.

22. The method of claim 8, wherein the second portion of the thermoplastic added to the first chamber is in pellet form when added to the first chamber.

23. The method of claim 9, wherein the second portion of the thermoplastic added to the first chamber is in pellet form when added to the first chamber.

24. The method of claim 11, wherein the second portion of the thermoplastic added to the second chamber is in pellet form when added to the second chamber.

25. The method of claim 18, wherein the second portion of the thermoplastic added to the second chamber is in pellet form when added to the second chamber.

26. The method of claim 8, wherein the second portion of the thermoplastic added to the first chamber is more than 20% of the total amount of the thermoplastic.

27. The method of claim 11, wherein the second portion of the thermoplastic added to the second chamber is more than 20% of the total amount of the thermoplastic.

28. The method of claim 18, wherein the second portion of the thermoplastic added to the second chamber is more than 20% of the total amount of the thermoplastic.

* * * * *

UNITED STATES PATENT AND TRADEMARK OFFICE
CERTIFICATE OF CORRECTION

| | | |
|---|---|---|
| PATENT NO. | : 7,625,980 B2 | Page 1 of 1 |
| APPLICATION NO. | : 11/484156 | |
| DATED | : December 1, 2009 | |
| INVENTOR(S) | : Oansuk Chung | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 487 days.

Signed and Sealed this

Second Day of November, 2010

David J. Kappos
*Director of the United States Patent and Trademark Office*